US012562011B2

(12) United States Patent
Shimozono et al.

(10) Patent No.: US 12,562,011 B2
(45) Date of Patent: Feb. 24, 2026

(54) DRIVING DATA NOTIFICATION SYSTEM AND METHOD, AND MOTORCYCLE

(71) Applicant: KAWASAKI MOTORS, LTD., Hyogo (JP)

(72) Inventors: Hayato Shimozono, Akashi (JP); Toshiyuki Moritake, Akashi (JP); Hirokazu Morita, Akashi (JP); Tomotaka Nakagawa, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 66 days.

(21) Appl. No.: 18/753,160

(22) Filed: Jun. 25, 2024

(65) Prior Publication Data

US 2025/0391206 A1 Dec. 25, 2025

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01); *G07C 5/0825* (2013.01); *G07C 5/085* (2013.01)

(58) Field of Classification Search
None
See application file for complete search history.

(56) References Cited

U.S. PATENT DOCUMENTS

2025/0222946 A1* 7/2025 Spence .................. G06V 20/56

FOREIGN PATENT DOCUMENTS

EP 2 868 512 5/2015
JP 2012088136 A * 5/2012
JP 6757925 B2 * 9/2020
JP 2021075093 A * 5/2021

* cited by examiner

*Primary Examiner* — Abdhesh K Jha
(74) *Attorney, Agent, or Firm* — Wenderoth, Lind & Ponack, L.L.P.

(57) ABSTRACT

A driving data notification system includes: a position detector configured to detect a position of a vehicle; a storage device configured to store driving data including position data of the vehicle detected by the position detector, and position data of a measurement point at which a lap time is measured; a processor configured to calculate the lap time based on the position data of the vehicle and the position data of the measurement point, in which the lap time calculated by the processor is to be stored in the storage device in a manner associated with the driving data, and a transmitter configured to transmit the lap time and the driving data stored in the storage unit to outside for causing the notification device to make a notification.

13 Claims, 5 Drawing Sheets

DRIVING DATA NOTIFICATION SYSTEM AND METHOD, AND MOTORCYCLE

BACKGROUND

Technical Field

The present disclosure relates to a driving data notification system, a driving data notification method, and a motorcycle.

Background Art

EP 2868512 A1 describes measuring a lap time on a motorcycle, by making an operation on a switch.

SUMMARY

In the conventional motorcycle described above, in order to measure the lap time, the driver of the vehicle needs to make an operation of a switch while driving. Therefore, there is room for improvement in the convenience.

An object of the present disclosure is to improve the convenience of a driving data notification system, a driving data notification method, and a motorcycle.

Provided as one aspect of the present disclosure is a driving data notification system for measuring a lap time that is a time required for a vehicle to complete a predetermined course, and for causing a notification device to make a notification of the lap time, the driving data notification system including:

- a position detector configured to detect a position of the vehicle;
- a storage device configured to store driving data including position data of the vehicle detected by the position detector, and position data of a measurement point at which the lap time is measured;
- a processor configured to calculate the lap time based on the position data of the vehicle and the position data of the measurement point, in which the lap time calculated by the processor is to be stored in the storage device in a manner associated with the driving data; and
- a transmitter configured to transmit the lap time and the driving data stored in the storage device to outside for causing the notification device to make a notification.

With the driving data notification system, a lap time is calculated based on the position data of the measurement point and the position data of the vehicle, the position data being stored in the storage device, and is stored in the storage device and transmitted to the outside for causing the notification device to make a notification. As a result, the driver of the vehicle is enabled to measure the lap time without making any operation for measuring the lap time while driving. As a result, a highly convenient driving data notification system can be provided.

Provided as another aspect of the present disclosure is a driving data notification method for measuring a lap time that is a time required for a motor vehicle to complete a predetermined course, and for causing a notification device to make a notification of the lap time, the driving data notification method including:

- detecting a position of the motor vehicle;
- storing, in a storage device, driving data including position data of the motor vehicle and position data of a measurement point at which the lap time is measured;

- calculating the lap time using the position data of the motor vehicle and the position data of the measurement point;
- storing the lap time in the storage device in a manner associated with the driving data; and
- transmitting the driving data and the lap time stored in the storage device to outside for causing the notification device to make a notification.

With the driving data notification method, a lap time is calculated based on the position data of the measurement point and the position data of the motor vehicle, the position data being stored in the storage device, and is stored in the storage device and transmitted to the outside for causing the notification device to make a notification. As a result, the driver of the motor vehicle is enabled to measure the lap time without making any operation for measuring the lap time while driving. As a result, a highly convenient driving data notification method can be provided.

Provided as a still another aspect of the present disclosure is a motorcycle including:

- a vehicle body;
- a position detector mounted on the vehicle body and configured to detect a position of the motorcycle;
- a storage device configured to store driving data including position data of the motorcycle detected by the position detector, and position data of a measurement point that is used as a reference of measurement of a lap time that is a time required for the motorcycle to complete a predetermined course;
- a processor configured to calculate the lap time using the position data of the motorcycle and the position data of the measurement point, in which the lap time calculated by the processor is to be stored in the storage device in a manner associated with the driving data; and
- a transmitter configured to transmit the lap time and the driving data stored in the storage device to outside.

With the motorcycle, a lap time is calculated based on the position data of the measurement point and the position data of the vehicle, the position data being stored in the storage device, and is stored in the storage device and transmitted to the outside for causing the notification device to make a notification. As a result, the driver of the vehicle is enabled to measure the lap time without making any operation for measuring the lap time while driving. As a result, a highly convenient motorcycle can be provided.

BRIEF DESCRIPTION OF DRAWINGS

The foregoing and the other features of the present disclosure will become apparent from the following description and drawings of an illustrative embodiment of the disclosure in which.

DETAILED DESCRIPTION

A driving data notification system 1, a driving data notification method, and a motorcycle 10 according to one embodiment of the present disclosure will now be described with reference to FIGS. 1 to 5. The functions of the elements disclosed herein may be performed using a circuit including a general-purpose processor, a special purpose processor, an integrated circuit, an application-specific integrated circuit (ASIC), a conventional circuit, and/or a combination thereof, or a processing circuit configured to or programmed to perform the functions disclosed herein. A processor is considered as a processing circuit or a circuit, because a processor includes transistors or other circuits. In the present disclosure, a circuit, a unit, or means is either a piece of hardware that performs the functions listed herein, or a piece of hardware programmed to perform the functions listed herein. The hardware may be hardware disclosed herein, or may be any other known hardware that is programmed or configured to perform the functions listed herein. When the hardware is a processor considered as a type of circuit, a circuit, means, or a unit is a combination of hardware and software, and the software is used for configuring the hardware and/or the processor.

The driving data notification system 1 according to the present embodiment is a system for measuring a lap time that is a time required for a vehicle (in the present embodiment, the motorcycle 10) to complete a predetermined course, and for causing a notification device 2 to make a notification of the lap time. The predetermined course includes a circuit course, a course other than a circuit course, and a predetermined section of such courses. Described in the following description is an example in which the notification device 2 measures the lap time that is the time required for the motorcycle 10 to complete a circuit course once, and makes a notification of the lap time.

Figure 1:
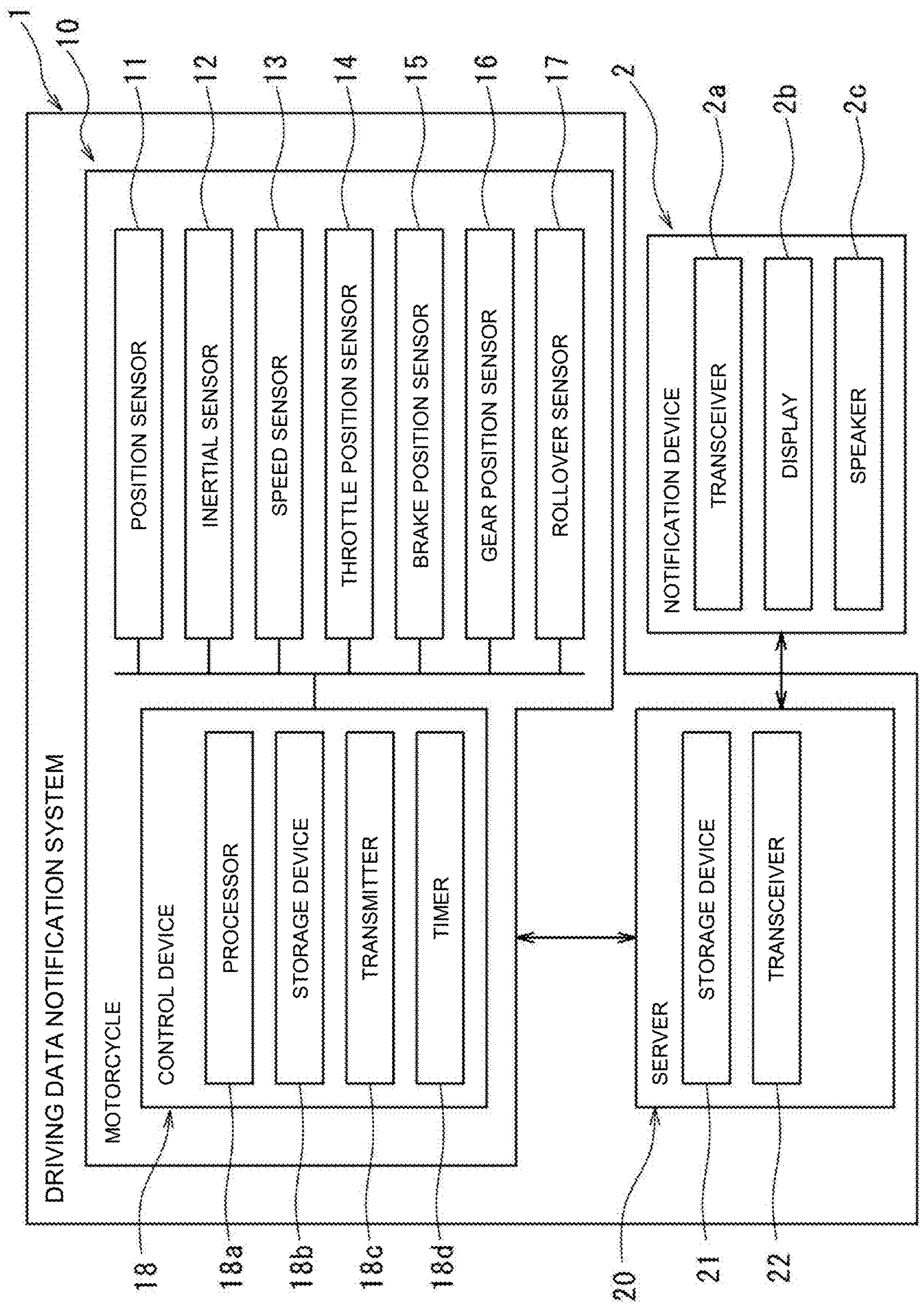
FIG. 1 is a configuration diagram of a driving data notification system 1 according to one embodiment of the present disclosure.

FIG. 1 is a configuration diagram of the driving data notification system 1 according to one embodiment of the present disclosure. Referring to FIG. 1, the driving data notification system 1 includes the motorcycle 10 and a server 20.

The motorcycle 10 according to the present embodiment is a motorcycle for a motocross. The motorcycle 10 according to the present embodiment includes an engine (not illustrated) as a driving source. The motorcycle 10 may include a motor as a driving source, instead of the engine. The motorcycle 10 may also have both an engine and a motor. The motorcycle 10 according to the present embodiment is an example of a vehicle and a motor vehicle according to the present disclosure.

The motorcycle 10 includes a position sensor 11, an inertial sensor 12, a speed sensor 13, a throttle position sensor 14, a brake position sensor 15, a gear position sensor 16, a rollover sensor 17, and a control device 18. The sensors 11 to 17 and the control device 18 are communicably connected to one another via controller area network (CAN) communication.

The position sensor 11 acquires position data of the motorcycle 10. The position sensor 11 includes a global positioning system (GPS) sensor or a global navigation satellite system (GNSS) sensor that acquires three-dimensional position data of the motorcycle 10. The position sensor 11 outputs position data indicating the current position of the motorcycle 10. The position sensor 11 is mounted on the vehicle body of the motorcycle 10. The position sensor 11 according to the present embodiment is an example of the position detector according to the present disclosure.

The inertial sensor 12 is an inertial measurement unit (IMU) for detecting the attitude of the motorcycle 10 or the driver. The inertial sensor 12 outputs attitude data indicating the attitude of the motorcycle 10 or the driver. The attitude of the motorcycle 10 includes a pitch (that is, how much the front side of the vehicle body is tilted off the ground), the roll (that is, how much the vehicle body is leaning), and the yaw of the vehicle body of the motorcycle 10. The attitude of the driver of the motorcycle 10 includes the inclination of the driver with respect to the vehicle body or the ground. The attitude data includes data indicating acceleration or angular velocity detected by the inertial sensor 12. The inertial sensor 12 is mounted on the vehicle body of the motorcycle 10.

The speed sensor 13 detects the speed of the motorcycle 10. The speed sensor 13 according to the present embodiment detects the speed of the motorcycle 10 by detecting the rotation speed of the front wheel or the rear wheel of the motorcycle 10, for example. The speed sensor 13 outputs the speed data indicating the speed of the motorcycle 10. The speed sensor 13 is mounted on the vehicle body of the motorcycle 10. The speed sensor 13 according to the present embodiment is an example of a speed detector according to the present disclosure.

The throttle position sensor 14 detects the amount by a throttle of the motorcycle 10 is operated, that is, the degree by which the throttle is opened. The throttle position sensor 14 outputs data indicating the amount by which the throttle is operated. The throttle position sensor 14 is mounted on the vehicle body of the motorcycle 10. The data indicating the amount of the throttle operation detected by the throttle position sensor 14 is an example of the operation data of the vehicle according to the present disclosure, and the throttle position sensor 14 is an example of an acquisition device according to the present disclosure.

The brake position sensor 15 detects the amount by which a brake pedal or a brake lever of the motorcycle 10 is operated. The brake position sensor 15 outputs data indicating the amount of the brake pedal operation or the brake lever operation. The brake position sensor 15 is mounted on the vehicle body of the motorcycle 10. The data indicating the amount of the brake pedal operation or the brake lever operation detected by the brake position sensor 15 is an example of the operation data of the vehicle according to the present disclosure, and the brake position sensor 15 is an example of the acquisition device according to the present disclosure.

The gear position sensor 16 detects an operation of a shift pedal of the motorcycle 10. The gear position sensor 16 outputs data indicating an operation of the shift pedal. The gear position sensor 16 is mounted on the vehicle body of the motorcycle 10. The data indicating the operation of the shift pedal detected by the gear position sensor 16 is an example of the operation data of the vehicle according to the present disclosure, and the gear position sensor 16 is an example of the acquisition device according to the present disclosure.

The rollover sensor 17 is an inclination angle sensor for detecting the inclination of the vehicle body of the motorcycle 10, in order to detect a rollover of the motorcycle 10. The rollover sensor 17 outputs data indicating a rollover of the motorcycle 10, specifically, data indicating an inclination of the motorcycle 10. The rollover sensor 17 is mounted on the vehicle body of the motorcycle 10. The rollover sensor 17 according to the present embodiment is an example of a rollover detector according to the present disclosure.

The control device 18 includes a processor 18*a*, a storage device 18*b*, a transmitter 18*c*, and a timer 18*d*.

The processor 18*a* includes, for example, a central processing unit (CPU) or a micro-processing unit (MPU) that implements a predetermined function in cooperation with software or a program. The processor 18*a* may be implemented as hardware such as a dedicated electronic circuit or a reconfigurable electronic circuit designed to implement a predetermined function, or may be implemented using various semiconductor integrated circuits. As the various semiconductor integrated circuits, for example, it is possible to use a microcomputer, a digital signal processor (DSP), a field-programmable gate array (FPGA), or an application-specific integrated circuit (ASIC), as well as a CPU and an MPU.

The processor 18*a* calculates the lap time based on the position data of a measurement point serving as a reference for lap time measurements, and the position data of the motorcycle 10 detected by the position sensor 11. Specifically, the processor 18*a* is configured to detect that the motorcycle 10 has passed the measurement point based on the position data of the measurement point and the position data of the motorcycle 10, and calculates the lap time from the data of time at which the motorcycle 10 has passed the measurement point and the data of time at which the motorcycle 10 has passed the same measurement point again.

The storage device 18*b* includes a random access memory (RAM) or a read-only memory (ROM) that stores therein software or a program. The storage device 18*b* stores therein the driving data including the position data of the motorcycle 10 detected by the position sensor 11 and the lap time calculated by the processor 18*a*, in a manner associated with one another. The storage device 18*b* also stores therein course data indicating the name or the location of a course in which the vehicle has run, in a manner associated with the lap time and the driving data.

The driving data includes, in addition to the position data of the motorcycle 10, the operation data of the motorcycle 10, the operation being made by the driver, the attitude data of the motorcycle 10 and the driver, the speed data of the motorcycle 10, and the rollover data of the motorcycle 10. The position data of the motorcycle 10 according to the present embodiment includes three-dimensional position data of the motorcycle 10. The operation data of the motorcycle 10 includes data indicating an amount by which the throttle is operated, data indicating an amount by which the brake pedal or the brake lever is operated, and data indicating how the shift pedal is operated. The rollover data of the motorcycle 10 includes data indicating a position where the motorcycle 10 has rolled over. The rollover data of the motorcycle 10 may include, in addition to the data indicating the position where the motorcycle 10 has rolled over, data indicating the position of a place where the motorcycle 10 is likely to roll over along the course, and data indicating how quickly the driver has restarted after the rollover.

The transmitter 18*c* transmits the lap time, the driving data, and the course data stored in the storage device 18*b* wirelessly to the server 20. The transmitter 18*c* may transmit the lap time, the driving data, and the course data wirelessly to the notification device 2. The transmitter 18*c* is implemented by the processor 18*a* executing a predetermined program.

The timer 18*d* generates time data including date and hour, minute, and second. The timer 18*d* is implemented by the processor 18*a* executing a predetermined program.

The server 20 receives the lap time and the driving data associated with each other from the transmitter 18*c* in the control device 18, and accumulates the lap time, the driving data, and the course data. The server 20 transmits the accumulated lap time, the driving data, and the course data wirelessly to the notification device. The server 20 includes a storage device 21 that stores therein the lap time, the driving data, and the course data, and a transceiver 22 that transmits the lap time, the driving data, and the course data stored in the storage device 21 wirelessly to the notification device 2.

The server 20 according to the present embodiment is configured to receive the lap time and the driving data associated with course data, from two or more different motorcycles 10. The storage device 21 stores therein the course data, the lap time, and the driving data corresponding to each of the motorcycles 10 in a manner associated with vehicle data for identifying the vehicle.

The notification device 2 is a device for notifying the user of the lap time and the driving data. The notification device 2 may be, for example, a mobile terminal such as a smartphone, a tablet terminal, or a personal digital assistant (PDA). The notification device 2 includes a transceiver 2*a* for communicating wirelessly with the server 20, a display 2*b* for notifying the lap time and the driving data by displaying, and a speaker 2*c* for notifying the lap time and the driving data by voice. The notification device 2 may include only one of the display 2*b* and the speaker 2*c*. The display 2*b* according to the present embodiment is an example of a display device according to the present disclosure, and the speaker 2*c* according to the present embodiment is an example of an audio output device.

Figure 2:
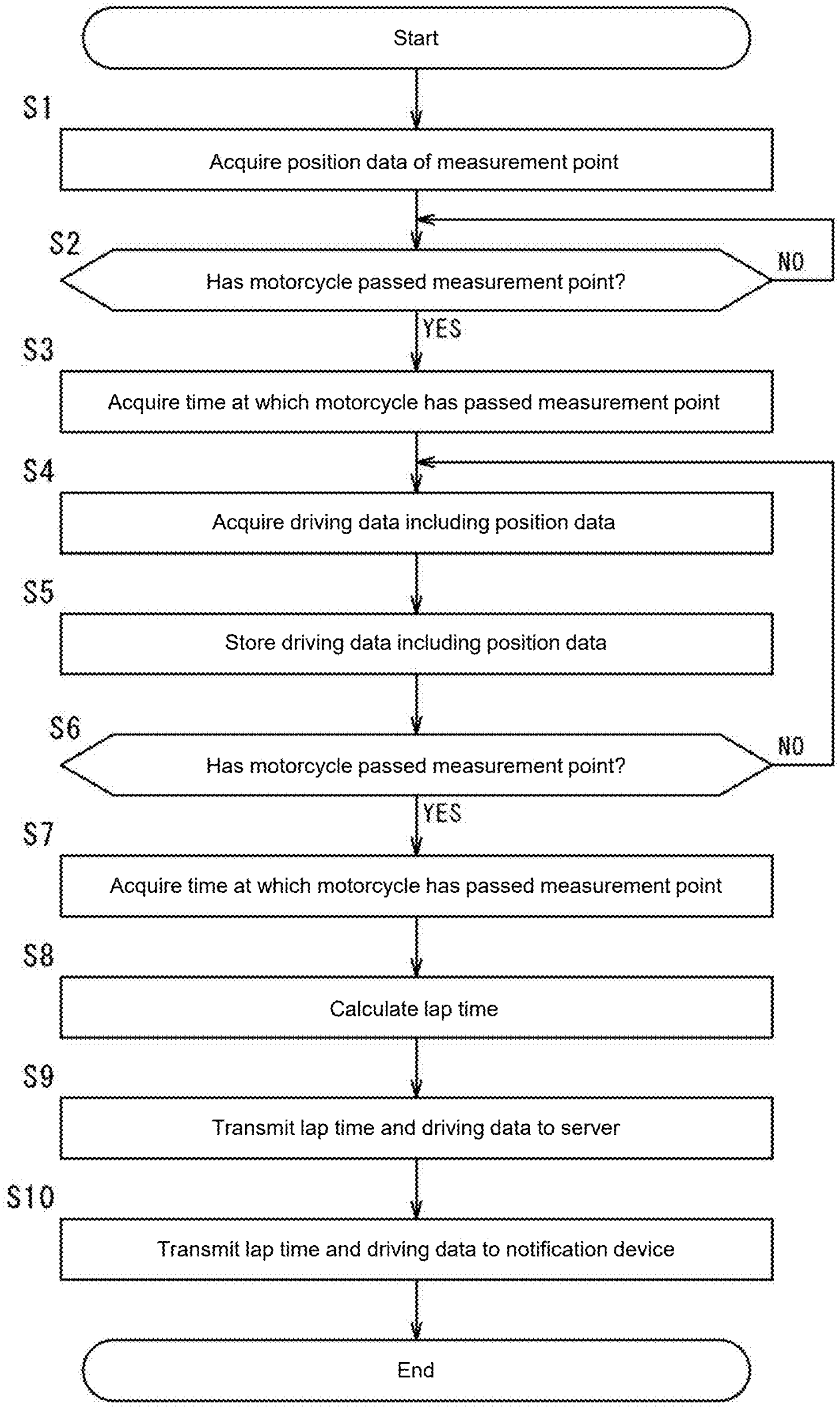
FIG. 2 is a flowchart of a driving data notification method according to an embodiment of the present disclosure.
Figure 5:
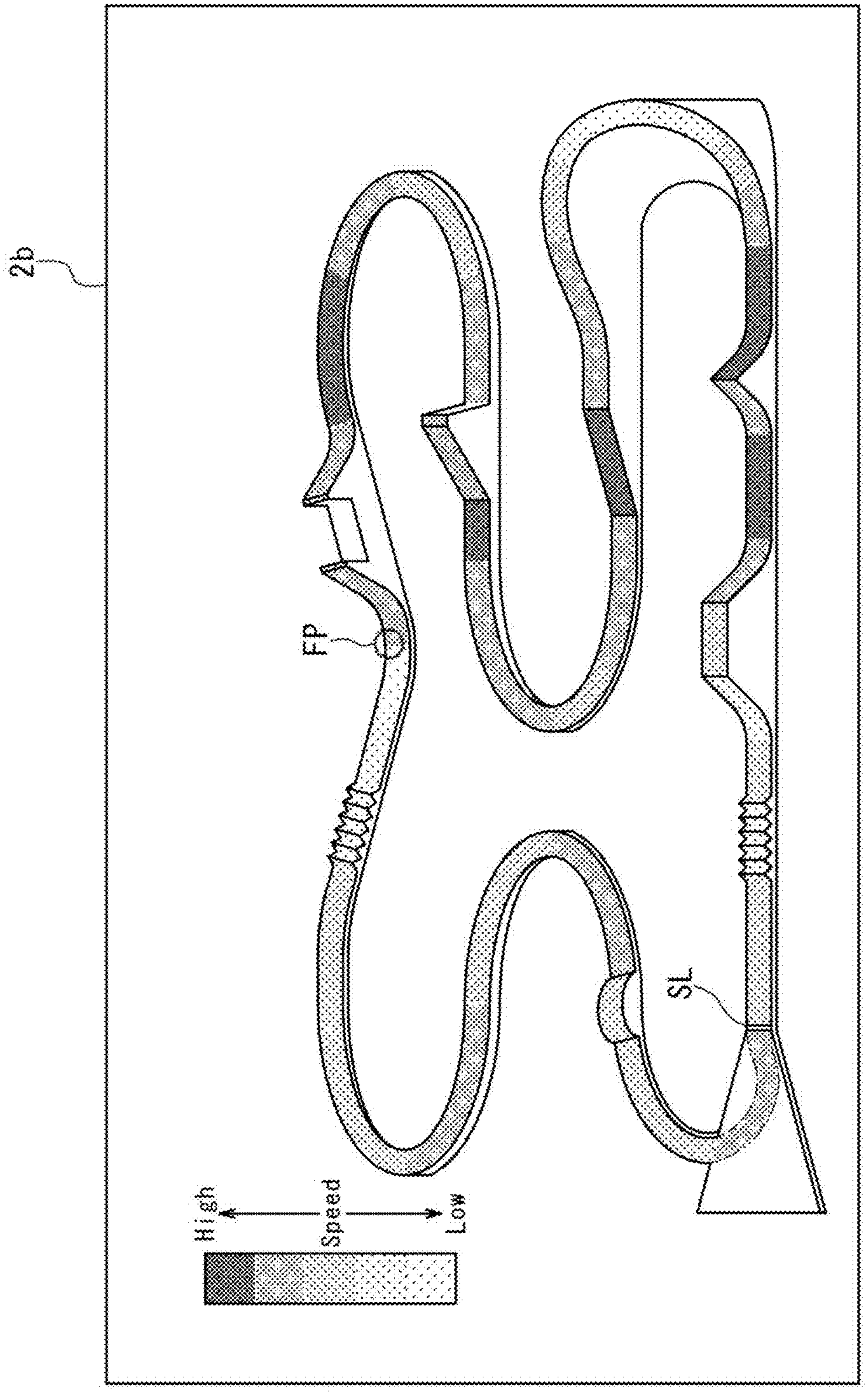
FIG. 5 is a diagram illustrating still another example of how a notification is made by the notification device.

A driving data notification method according to the present embodiment will now be described. FIG. 2 is a flowchart illustrating an example of processing by which the driving data notification system 1 illustrated in FIG. 1 measures the lap time of the motorcycle 10 and causes the notification device 2 to make the notification. Described in the following description is an example for measuring a lap time that is the time required for the motorcycle 10 to complete the circuit once in a circuit course, as illustrated in FIG. 5, and for causing the notification device 2 to make the notification.

In step S1, position data of a measurement point serving as a reference for the lap time measurement is acquired. In the present embodiment, when the user operates a predetermined operation button (not illustrated) on the motorcycle 10, the control device 18 acquires the position data of the motorcycle 10 from the position sensor 11, as the position data of the measurement point, and stores the position data in the storage device 18*b*. For example, when the motorcycle 10 passes a start line (e.g., the reference sign SL in FIG. 5) of the course, or when the motorcycle 10 is positioned at the start line of the course, the driver operates a predetermined operation button on the motorcycle 10 so that the start line of the course can be used as the measurement point. When the position data of the measurement point is acquired and stored by the control device 18 in step S1, the process is shifted to step S2.

In step S2, it is determined whether the motorcycle 10 has passed the measurement point. In step S2, the control device 18 determines whether the motorcycle 10 has passed the measurement point based on the position data of the measurement point and the position data of the motorcycle 10. Specifically, the control device 18 determines whether the current position of the motorcycle 10 is within a predetermined range from the measurement point (e.g., within a range of 5 meters from the measurement point). If it is determined in step S2 that the current position of the motorcycle 10 is within the predetermined range from the measurement point, that is, if YES in step S2, the process is shifted to step S3. If it is determined in step S2 that the current position of the motorcycle 10 is not within the predetermined range from the measurement point, that is, if NO in step S2, the process in step S2 is repeated.

In step S3, time data when the motorcycle 10 has passed the measurement point is acquired. Specifically, the timer 18*d* of the control device 18 acquires data of the time at which the motorcycle 10 has passed the measurement point. The storage device 18*b* in the control device 18 also stores the acquired time data. Once the data of the time at which the motorcycle 10 has passed the measurement point is acquired in step S3, the process is shifted to step S4.

In step S4, driving data including position data of the motorcycle 10 is acquired. Specifically, the control device 18 acquires driving data of the motorcycle 10 from the sensors 11 to 17. Once the driving data is acquired in step S4, the process is shifted to step S5.

The driving data includes, in addition to the position data of the motorcycle 10, the operation data of the motorcycle 10, the operation being made by the driver, the attitude data of the motorcycle 10 and the driver, the speed data of the motorcycle 10, and the rollover data of the motorcycle 10.

The control device 18 acquires the position data of the motorcycle 10 from the position sensor 11. The position data of the motorcycle 10 according to the present embodiment includes three-dimensional position data of the motorcycle 10.

The operation data of the motorcycle 10 includes data indicating an amount by which the throttle is operated, data indicating an amount by which the brake pedal or the brake lever is operated, and data indicating how the shift pedal is operated. The control device 18 acquires data indicating the amount by which the throttle is operated, the data indicating the amount by which the brake pedal or the brake lever is operated, and data indicating that the shift pedal has been operated, from the throttle position sensor 14, the brake position sensor 15, and the gear position sensor 16, respectively.

The control device 18 acquires the attitude data of the motorcycle 10 and the driver, the speed data of the motorcycle 10, and the rollover data of the motorcycle 10 from the inertial sensor 12, the speed sensor 13, and the rollover sensor 17, respectively.

In step S5, the driving data including the position data acquired in step S4 is stored. Specifically, in step S5, the storage device 18*b* stores the driving data including the position data acquired in step S4. At this time, the storage device 18*b* stores the position data of the motorcycle 10, the operation data of the motorcycle 10, the attitude data of the motorcycle 10 and the driver, the speed data of the motorcycle 10, and the rollover data of the motorcycle 10 in a manner associated with one another. In step S5, once the driving data including the position data is stored in the storage device 18*b*, the process is shifted to step S6.

In step S6, it is determined whether the motorcycle 10 has passed the measurement point. In step S6, the control device 18 determines whether the motorcycle 10 has passed the measurement point, based on the position data of the measurement point and the position data of the motorcycle 10. Specifically, the control device 18 determines whether the current position of the motorcycle 10 is within a predetermined range from the measurement point (e.g., within a range of 5 meters from the measurement point). If it is determined that the current position of the motorcycle 10 is within the predetermined range from the measurement point in step S6, that is, if YES in step S6, the process is shifted to step S7. If it is determined that the current position of the motorcycle 10 is not within the predetermined range from the measurement point in step S6, that is, if NO in step S6, the process is shifted to step S4.

In step S7, the data of the time at which the motorcycle 10 has passed the measurement point is acquired. Specifically, when it is determined that the motorcycle 10 has passed the measurement point in step S6, the timer 18*d* of the control device 18 acquires the time data. The storage device 18*b* in the control device 18 also stores the acquired time data. Once the time data when the motorcycle 10 has passed the measurement point is acquired in step S7, the process is shifted to step S8.

In step S8, the lap time is calculated based on the position data of the measurement point and the position data of the motorcycle 10. In step S8, the processor 18*a* calculates the lap time based on the data of the time at which the motorcycle 10 has passed the measurement point and the data of the time at which the motorcycle 10 passes the measurement point next time. In step S8, the control device 18 automatically calculates the lap time without requiring the operation of the driver. The calculated lap time is stored in the storage device 18*b* in a manner associated with the driving data of the lap.

In step S9, the lap time calculated in step S8 is transmitted to the server 20, in a manner associated with the driving data. Specifically, in step S9, the transmitter 18*c* transmits the lap time and the driving data stored in the storage device 18*b* wirelessly to the server 20.

When the lap time has been calculated for the second and subsequent rounds in the circuit course, in step S9, the transmitter 18*c* transmits the lap time and driving data in question, as well as the shortest one of the plurality of the lap times stored in the storage device 18*b* and the driving data associated with the shortest lap time to the server 20.

In the present embodiment, the transmitter 18*c* transmits the course data to the server 20 in step S9, together with the lap times and the driving data. The server 20 accumulates the lap times and the driving data received from the transmitter 18*c* in the storage device 18*b*, in a manner associated with the course data.

In step S10, the lap times, the driving data, and the course data associated with each other are transmitted wirelessly from the server 20 to the notification device 2. At this time, the server 20 transmits the lap times and the driving data of the motorcycle 10, as well as the lap times and the driving data of another motorcycle different from the motorcycle 10, to the server 20 wirelessly.

After the lap times, the driving data, and the course data associated with one another are wirelessly transmitted from the server 20 to the notification device 2 in step S10, the process is ended. Note that, when measured is the lap time for the second lap or laps thereafter in the lap course, the process may be shifted to step S3 after step S9 or step S10.

Figure 3:
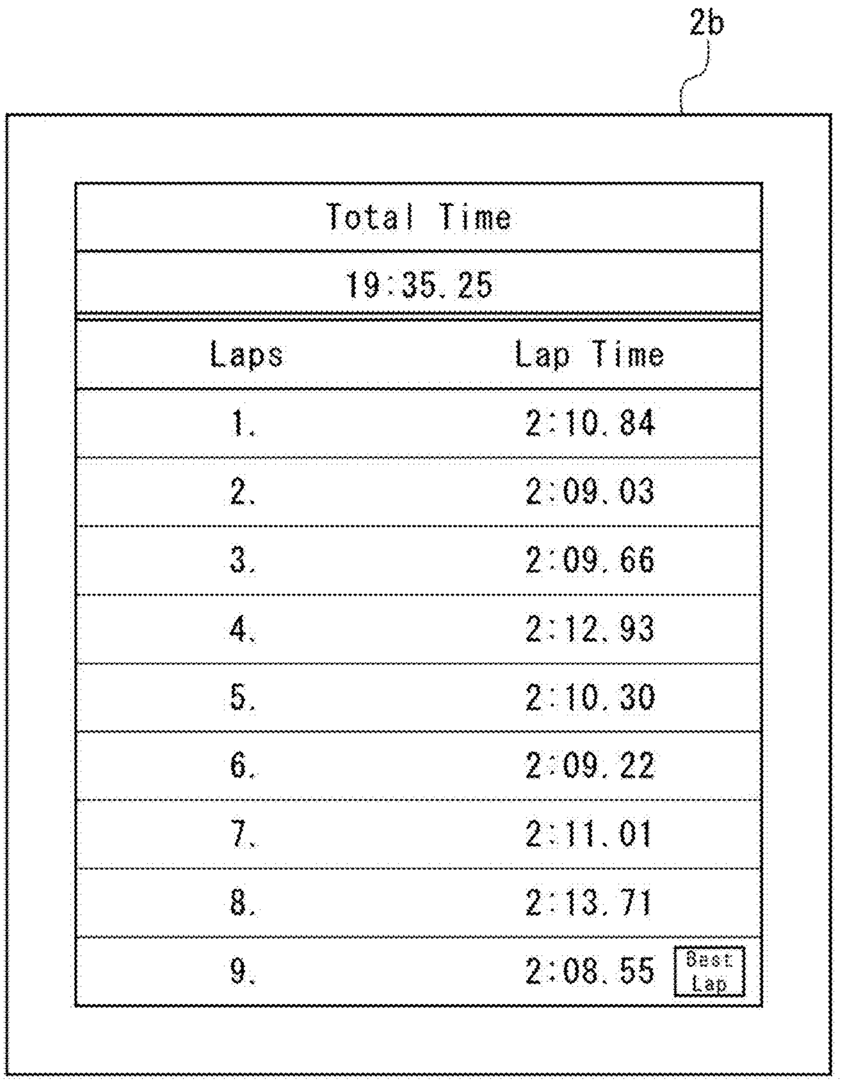
FIG. 3 is a diagram illustrating an example of how a notification is made by a notification device.

FIG. 3 is a diagram illustrating an example of how a notification is made by a notification device 2. The notification device 2 may be configured to display the lap times and the best time on the display 2*b*, as illustrated in FIG. 3, based on the lap times received from the server 20. The best time may be the shortest one of the lap times measured on the same day, or may be the shortest one of the lap times measured in the past.

Figure 4:
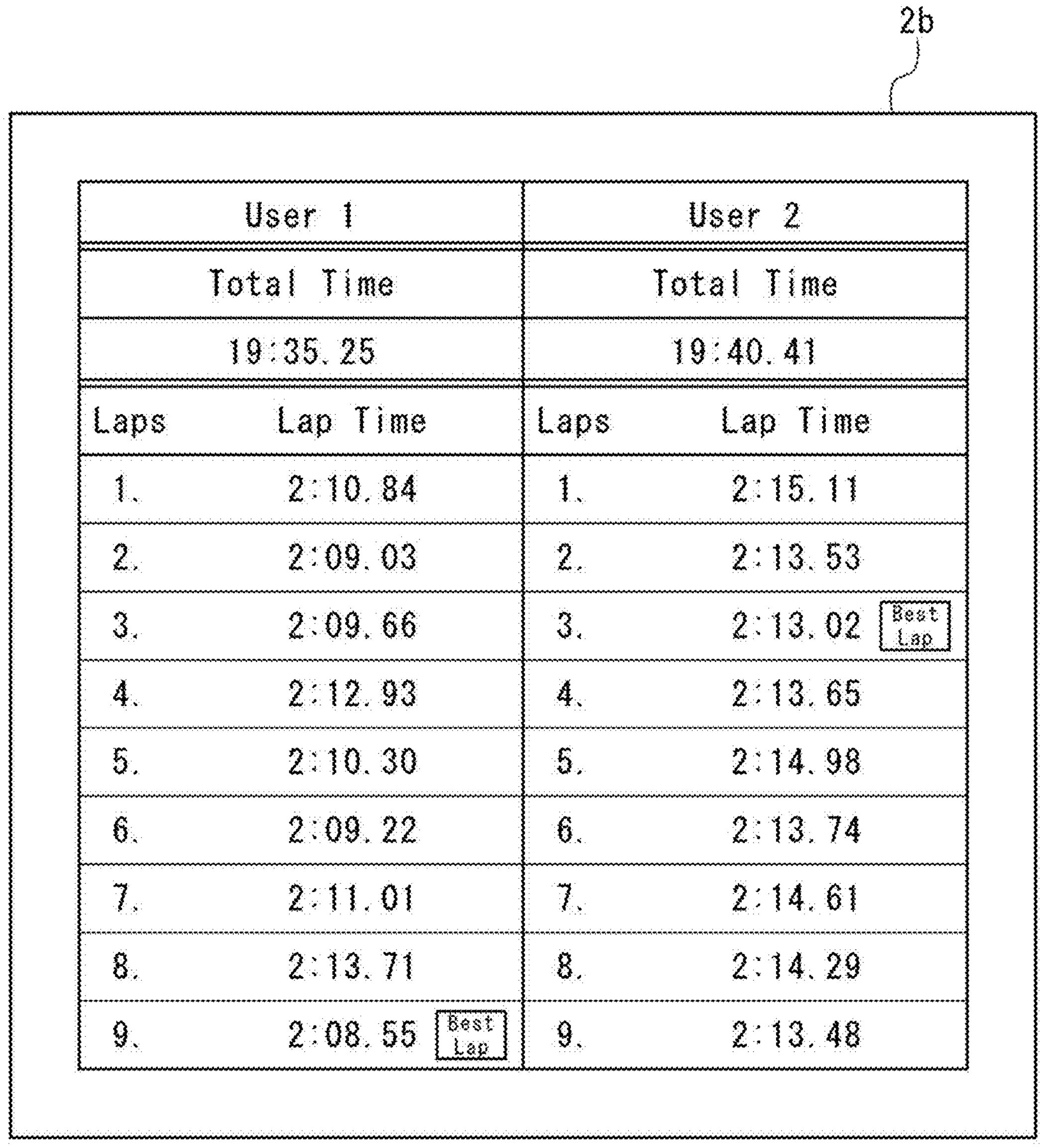
FIG. 4 is a diagram illustrating another example of how a notification is made by the notification device.

FIG. 4 is a diagram illustrating another example of how a notification is made by the notification device 2. Based on the lap times of two different motorcycles 10 on the same course, the lap times being received from the server 20, the notification device 2 may display the lap times and the best times of the two different motorcycles 10 side by side on the display 2*b*, as illustrated in FIG. 4. In addition, the notification device 2 may display how the two different motorcycles 10 are running on the display 2*b*, as an animation using avatars or the like.

FIG. 5 is a diagram illustrating still another example of how a notification is made by the notification device 2. Based on the three-dimensional position data of the motorcycle 10 and the speed data in the plurality of sections of the course, the notification device 2 may display a three-dimensional image of the course on the display 2*b* (illustrated in FIG. 1) as illustrated in FIG. 5, and may display the speed data on the plurality of sections of the course in a manner superimposed over the three-dimensional image of the course. Furthermore, as illustrated in FIG. 5, the position where the motorcycle 10 has rolled over may be displayed on the three-dimensional image of the circuit course (indicated by the reference sign FP in FIG. 5), based on the rollover data of the motorcycle.

The control device 18 according to the present embodiment generates data related to maintenance or failure of parts related to the engine based on data indicating the distance by which the motorcycle 10 has travelled, the operation data, the rollover data, and the like. The transmitter 18*c* transmits the data related to the maintenance or the failure of the parts related to the engine to the server 20, for causing the notification device 2 to make a notification, and the notification device 2 notifies the user of the information of the maintenance or the failure of the parts related to the engine. The information of the maintenance or the failure of the parts related to the engine may be information about the timing for replacing the piston, the clutch plate, the air filter, or the like, or may be information about the amount of remaining engine oil or the timing for replacing the engine oil.

With the driving data notification system 1, the driving data notification method, and the motorcycle 10 according to the embodiment described above, the following advantageous effects are achieved.

(1) With the driving data notification system 1 according to the present embodiment, a lap time calculated based on the position data of the measurement point and the position data of the vehicle (in the present embodiment, the motorcycle 10), the position data being stored in the storage device 18*b*, is stored in the storage device 18*b*, and is transmitted to the outside (in the present embodiment, the server 20) for causing the notification device 2 to make a notification. As a result, a measurement of the lap time is collected automatically. Therefore, the driver of the vehicle does not need to make any operation for measuring the lap time while driving. As a result, a highly convenient driving data notification system 1 can be provided.

(2) When the vehicle passes the measurement point and the lap time is calculated, the transmitter 18*c* transmits the lap time to the outside (in the present embodiment, to the server 20). This allows the notification device 2 to notify (e.g., display) the lap time in a timely manner, for example. As a result, the user including the driver of the vehicle can check the lap time for each lap in a timely manner. Therefore, a highly convenient driving data notification system 1 can be provided.

(3) The transmitter 18*c* transmits driving data associated with the latest one of a plurality of lap times stored in the storage device 18*b*, and driving data associated with the shortest one of the plurality of lap times stored in the storage device to the outside (in the present embodiment, the server 20) for causing the notification device 2 to make a notification. This allows, for example, the notification device 2 to display the driving data in the fastest lap and the driving data in the latest lap side by side. As a result, the user including the driver can compare the driving data in the fastest lap with the driving data in the latest lap. Therefore, a highly convenient driving data notification system 1 can be provided.

(4) The driving data includes speed data of the vehicle (the motorcycle 10, in the present embodiment) in a plurality of sections of a predetermined course, and the transmitter 18*c* transmits the speed data of the vehicle on each of the plurality of sections to the outside (the server 20, in the present embodiment) for causing the notification device 2 to make a notification. This allows the notification device 2 to notify (e.g., display) the speed data on the plurality of sections, for example. As a result, the user can check the speed on each of such sections. Therefore, a highly convenient driving data notification system 1 can be provided.

(5) The position detector (in the present embodiment, the position sensor 11) detects a three-dimensional position of the vehicle (the motorcycle 10 in the present embodiment), and the position data of the vehicle is three-dimensional position data. Thus, as one example, by causing the notification device 2 to display the three-dimensional position of the vehicle, the user can check the presence of an uphill or a downhill on the course. As another example, when there is a jump ramp on the course, by causing the notification device 2 to display the three-dimensional position of the vehicle, the user can check the height of his/her jump. As still another example, when there is a jump ramp on the course, by causing the notification device 2 to display a hang time calculable based on the three-dimensional position of the vehicle, the user can check his/her hang time. Therefore, a highly convenient driving data notification system 1 can be provided.

(6) The driving data notification system 1 further includes an acquisition device (in the present embodiment, the throttle position sensor 14, the brake position sensor 15, and the gear position sensor 16) mounted on the vehicle (the motorcycle 10 in the present embodiment) and configured to acquire operation data of the vehicle. The driving data includes the operation data, and the transmitter 18*c* transmits the operation data associated with the position data of the vehicle to the outside (in the present embodiment, the server 20) for causing the notification device 2 to make a notification. This allows, for example, the notification device 2 to notify (e.g., display) the position data of the vehicle as well as the operation data of the vehicle. As a result, the user can check the position data of the vehicle and the operation data of the vehicle at the same time. Therefore, a highly convenient driving data notification system 1 can be provided.

(7) The driving data notification system 1 further includes an attitude detector (in the present embodiment, the inertial sensor 12) mounted on the vehicle (in the present embodiment, the motorcycle 10) and configured to detect an attitude of the vehicle or the driver. The driving data includes the attitude data of the vehicle or the driver, and the transmitter 18*c* transmits the attitude data of the vehicle or the driver associated with the position data of the vehicle to the outside (in the present embodiment, the server 20) for notification in the notification device 2. This allows, for example, the notification device 2 to notify (for example, display) the position data of the vehicle and the attitude data of the vehicle or the driver together. As a result, the user can check the position data of the vehicle and the vehicle or driver attitude data at the same time. Therefore, a highly convenient driving data notification system 1 can be provided.

(8) The driving data notification system 1 further includes a rollover detector (in the present embodiment, the rollover sensor 17) mounted on the vehicle (the motorcycle 10 in the present embodiment) and configured to detect rollover of the vehicle. The driving data includes the rollover data of the vehicle, and the transmitter 18*c* transmits the rollover data of the vehicle associated with the position data of the vehicle to the outside (in the present embodiment, the server 20) for notification in the notification device 2. This allows, for example, the notification device to notify (e.g., display) the position data of the vehicle and the rollover data of the vehicle at the same time. As a result, the user can check the position data of the vehicle and the rollover data of the vehicle at the same time. Therefore, a highly convenient driving data notification system 1 can be provided.

(9) The driving data notification system 1 further includes a server 20 configured to receive the lap time and the driving data of the vehicle (the motorcycle 10 according to the present embodiment) from the transmitter 18*c*, and to accumulate the lap time and the driving data in a manner associated with the course data. The server 20 transmits the lap time and the driving data of the vehicle on a predetermined course, as well as the lap time and the driving data of another vehicle different from that vehicle on the predetermined course, to the notification device 2 for causing the notification device 2 to make a notification. This allows, for example, the notification device 2 to display the lap times or the driving data of a plurality of different vehicles side by side. As a result, the user can compare his or her lap time or driving data with the lap time or driving data of another person (e.g., an advanced driver). Therefore, a highly convenient driving data notification system 1 can be provided.

(10) The transmitter 18*c* transmits data related to maintenance or a failure of a part related to a driving source (in the present embodiment, an engine) that is associated with the driving data, to the outside (in the present embodiment, the server 20) for causing the notification device 2 to make a notification. This allows, for example, the notification device 2 to notify (e.g., display) data related to maintenance or a failure of the part related to the driving source, as well as the driving data. As a result, a user can check the data related to the maintenance or the failure of the part related to the driving source, and the driving data at the same time. Therefore, a highly convenient driving data notification system 1 can be provided.

(11) The notification device 2 includes a display device (in the present embodiment, the display 2*b*). With this, the user can visually check the lap time or the driving data. As a result, a highly convenient driving data notification system 1 can be provided.

(12) With the driving data notification method according to the present embodiment, a lap time calculated based on the position data of the measurement point and the position data of the motor vehicle (in the present embodiment, the motorcycle 10), the position data being stored in the storage device 18*b*, is stored in the storage device 18*b*, and is transmitted to the outside (in the present embodiment, the server 20) for causing the notification device 2 to make a notification. As a result, a measurement of the lap time is collected automatically. Therefore, the driver of the motor vehicle does not need to make any operation for measuring the lap time while driving. As a result, a highly convenient driving data notification method can be provided.

(13) With the motorcycle 10 according to the present embodiment, a lap time calculated based on the position data of the measurement point and the position data of the motorcycle 10, the position data being stored in the storage device 18*b*, is stored in the storage device 18*b*, and is transmitted to the outside (in the present embodiment, the server 20) for causing the notification device 2 to make a notification. As a result, a measurement of the lap time is collected automatically. Therefore, the driver of the motorcycle 10 does not need to make any operation for measuring the lap time while driving. As a result, a highly convenient motorcycle 10 can be provided.

The driving data notification system, the driving data notification method, and the motorcycle according to the present disclosure are not limited to those according to the embodiment described above, and various changes are still possible.

In the embodiment described above, the position sensor 11 is mounted on the vehicle body of the motorcycle 10, but it is also possible for the position sensor 11 not to be mounted on the vehicle body of the motorcycle 10. For example, it is also possible to use, as the position sensor 11, a GPS sensor or a GNSS sensor installed in a portable terminal, such as a smartphone carried by the driver.

In the embodiment described above, the inertial sensor 12 is mounted on the vehicle body of the motorcycle 10, but it is also possible for the inertial sensor 12 not to be mounted on the vehicle body of the motorcycle 10. For example, it is also possible to use, as the inertial sensor 12, an IMU, an acceleration sensor, or a gyro sensor installed on a portable terminal such as a smartphone carried by the driver.

In the embodiment described above, as examples of the operation data according to the present disclosure, the data indicating the amount by which the throttle is operated, the data indicating the amount by which the brake pedal or the brake lever is operated, and the data indicating that the shift pedal has been operated have been described, but the operation data according to the present disclosure is not limited thereto. The operation data according to the present disclosure may include, for example, data indicating the amount by which the handlebar of the motorcycle 10 is operated, that is, data indicating a steering angle.

In the embodiment described above, the driver of the motorcycle 10 operates the operation switch to acquire the position data of the measurement point serving as the reference of the measurement of the lap time. However, it is also possible to use the position data provided by the user in advance, before driving the motorcycle 10 on a predetermined course, as the position data of the measurement point. In particular, when the course is not a circuit course, it is preferable for the position data of the point at which the measurement of the lap time is started and the point at which the measurement is ended to be input in advance.

The control device 18 has been described as forming a part of the motorcycle 10, but is not limited thereto, and may be included in an external device that can be mounted on the motorcycle 10.

The data displayed on the display 2*b* is not limited to the lap time data, the speed data of the motorcycle 10, and the rollover data illustrated in FIGS. 3 to 5. For example, the attitude data of the motorcycle 10 and the driver and the operation data of the motorcycle 10 may be displayed on the display 2*b*.

What is claimed is:

1. A driving data notification system for measuring a lap time that is a time required for a vehicle to complete a predetermined course, and for causing a notification device to make a notification of the lap time, the driving data notification system comprising:

a position detector configured to detect a position of the vehicle;

a storage device configured to store driving data including position data of the vehicle detected by the position detector, and position data of a measurement point at which the lap time is measured;

a processor configured to calculate the lap time based on the position data of the vehicle and the position data of the measurement point, wherein the lap time calculated by the processor is to be stored in the storage device in a manner associated with the driving data; and a transmitter configured to transmit the lap time and the driving data stored in the storage device to outside for causing the notification device to make a notification.

2. The driving data notification system according to claim 1, wherein the transmitter is configured to transmit the lap time to outside when the vehicle passes the measurement point and the lap time is calculated.

3. The driving data notification system according to claim 1, wherein the transmitter is configured to transmit, to outside, the driving data associated with a latest one of a plurality of lap times stored in the storage device, and the driving data associated with a shortest one of the plurality of lap times stored in the storage device, for causing the notification device to make a notification.

4. The driving data notification system according to claim 1, further comprising a speed detection device mounted on the vehicle and configured to detect a speed of the vehicle, wherein the driving data includes speed data of the vehicle in a plurality of sections of the predetermined course, and the transmitter is configured to transmit the speed data of the vehicle in each of the plurality of sections to outside for causing the notification device to make a notification.

5. The driving data notification system according to claim 1, wherein the position detector is configured to detect a three-dimensional position of the vehicle, and the position data of the vehicle is three-dimensional position data.

6. The driving data notification system according to claim 1, further comprising an acquisition device mounted on the vehicle and configured to acquire operation data of the vehicle, wherein the driving data includes the operation data, and the transmitter is configured to transmit the operation data associated with the position data of the vehicle to outside for causing the notification device to make a notification.

7. The driving data notification system according to claim 1, further comprising an attitude detection device mounted on the vehicle and configured to detect an attitude of the vehicle or a driver, wherein the driving data includes attitude data of the vehicle or the driver, and the transmitter is configured to transmit the attitude data associated with the position data of the vehicle to outside for causing the notification device to make a notification.

8. The driving data notification system according to claim 1, further comprising a rollover detector mounted on the vehicle and configured to detect a rollover of the vehicle, wherein the driving data includes rollover data of the vehicle, and the transmitter is configured to transmit the rollover data associated with the position data of the vehicle to outside for causing the notification device to make a notification.

9. The driving data notification system according to claim 1, further comprising a server configured to receive the lap time and the driving data from the transmitter, and to accumulate the lap time and the driving data in a manner associated with the predetermined course, wherein the server is configured to transmit, to the notification device, the lap time and the driving data of the vehicle on the predetermined course as well as the lap time and the driving data of another vehicle different from the vehicle on the predetermined course, as well as, for causing the notification device to make a notification.

10. The driving data notification system according to claim 1, wherein the transmitter is configured to transmit data related to maintenance or a failure of a part related to a driving source, the data being associated with the driving data, to outside for causing the notification device to make a notification.

11. The driving data notification system according to claim 1, wherein the notification device includes a display device.

12. A driving data notification method for measuring a lap time that is a time required for a motor vehicle to complete a predetermined course, and for causing a notification device to make a notification of the lap time, the driving data notification method comprising:

detecting a position of the motor vehicle;

storing, in a storage device, driving data including position data of the motor vehicle, and position data of a measurement point at which the lap time is measured;

calculating the lap time using the position data of the motor vehicle and the position data of the measurement point;

storing the lap time in the storage device in a manner associated with the driving data; and transmitting the driving data and the lap time stored in the storage device to outside for causing the notification device to make a notification.

13. A motorcycle comprising:

a vehicle body;

a position detector mounted on the vehicle body and configured to detect a position of the motorcycle;

a storage device configured to store driving data including position data of the motorcycle detected by the position detector, and position data of a measurement point that is used as a reference of measurement of a lap time that is a time required for the motorcycle to complete a predetermined course;

a processor configured to calculate the lap time using the position data of the motorcycle and the position data of the measurement point, wherein the lap time calculated by the processor is to be stored in the storage device in a manner associated with the driving data; and a transmitter configured to transmit the lap time and the driving data stored in the storage device to outside.

* * * * *